United States Patent [19]

Sprung

[11] Patent Number: 4,982,527
[45] Date of Patent: Jan. 8, 1991

[54] SEEDLING PROPAGATION ASSEMBLY

[76] Inventor: Philip D. Sprung, c/o 1001-10th Avenue, S.W., Calgary, Alberta, Canada, T2R 0B7

[21] Appl. No.: 262,472

[22] Filed: Oct. 25, 1988

Related U.S. Application Data

[63] Continuation of Ser. No. 947,637, Dec. 30, 1986, abandoned.

[51] Int. Cl.⁵ .................. A01G 31/00; A01G 9/02; E02B 5/00
[52] U.S. Cl. ............................... 47/59; 47/63; 47/86; 405/118
[58] Field of Search ............... 47/59, 61, 62, 64, 63, 47/66, 71, 75, 79, 82, 83, 85, 86, 87, 18, 39; 405/18, 19, 20, 21, 22, 23

[56] References Cited

U.S. PATENT DOCUMENTS

| | | | |
|---|---|---|---|
| 428,822 | 5/1890 | Belding | 405/121 |
| 1,983,806 | 12/1934 | Norman | 47/18 |
| 2,170,671 | 8/1939 | Adler | 405/118 |
| 2,655,283 | 10/1953 | Moldt | 47/87 X |
| 3,751,852 | 8/1973 | Schrepper | 47/87 |
| 3,772,827 | 11/1973 | Ware | 47/62 X |
| 3,852,912 | 12/1974 | Diller | 47/39 X |
| 4,291,494 | 9/1981 | Knablein et al. | 47/87 X |
| 4,312,152 | 1/1982 | Drury et al. | 47/62 X |
| 4,595,725 | 1/1985 | Talbott | 47/85 |

FOREIGN PATENT DOCUMENTS

| | | | |
|---|---|---|---|
| 2017100 | 10/1970 | Fed. Rep. of Germany | 47/85 |
| 2363980 | 4/1978 | France | 47/39 |

*Primary Examiner*—Robert A. Hafer
*Assistant Examiner*—D. Neal Muir
*Attorney, Agent, or Firm*—Kenyon & Kenyon

[57] ABSTRACT

There is provided a new and useful propagation assembly consisting of at least one propagation tray comprising a lower plant support section including at least one longitudinal channel for nutrient solution flow; and an upper space section having a series of spaced openings positioned longitudinally above each at least channel.

12 Claims, 4 Drawing Sheets

SEEDLING PROPAGATION ASSEMBLY

This is a continuation of application Ser. No. 947,637 filed Dec. 30, 1986, now abandoned.

This application relates to seedling propagation assemblies which are particularly well suited to nutrient film propagation techniques.

BACKGROUND OF THE INVENTION

Limited amounts of arable land and adverse environmental conditions, whether natural or man made, have resulted in the use for many years of closed environment structures. These have for the most part been greenhouses of the most basic type. However, over the years methods of plant husbandry and improved structures of the greenhouse type have been constantly under development.

One relatively recent advance in controlled environment husbandry has been the use of nutrient film techniques. In general terms these techniques involve the contacting of the bottom of a plant root system with a thin stream of nutrient solution. The solution soaks up through the remainder of the root system by wicking or capillary action. A great many external influences affect the relatively sensitive nutrient film technique. Efforts are now underway to control various of these influences to improve both the technical aspects and the economics of the systems.

In nutrient film plant propagation techniques it is commonly the case that seedlings are propagated in plant nursery or in a nursery section of a production facility and are then at an appropriate time transplanted into a production area of the facility. Seed germination and the initial growth period for young plants require substantially different conditions than those appropriate for later growth to maturity. For example, the space requirements for the seedlings are clearly substantially less than is the case for mature plants. Similarly, the amount and content of nutrient solution may vary in the two situations. For these and other reasons the transplant procedure is utilized.

There are a number of problems inherent in the transplant procedure. For example, adequate spacing of plantings must be maintained to allow equal access of light to all seedlings and to prevent the root system of one planting from entangling with the root system of the next. The latter situation if allowed to occur results in a substantial shock to the plants when the root systems are separated. The plant growth is consequently set back.

As well, it is essential to provide proper nourishment in the nutrient film and to ensure that the plantings have to as great an extent as possible equal access to the nutrient solution.

Various types of trays, boxes and the like currently utilized for seedling propagation have been found to be inadequate in various of the areas discussed. Accordingly, there is a need for an improved seedling propagation assembly. Against this background such an assembly is provided.

PRIOR ART

The applicant is not aware of any prior patents which are of relevance to the present invention.

Various systems which have been proposed suffer from the shortcomings noted above and are thus not acceptable for applicant's purposes.

In addition to lack of proper spacing and lack of proper nutrient solution distribution, prior systems frequently provide unnecessary shock to seedlings by virtue of having to remove the seedlings from the propagation container to a transport container, transport the plants to the production container, and again transfer the plants to the production container. This multiple handling is also unacceptable in preferred situations.

SUMMARY OF THE INVENTION

An assembly of components has now been developed which provides an improved system for seed germination and seedling propagation utilizing nutrient film techniques. The system contributes to improved nutrient solution aeration and distribution to the plantings and to reduction of transplant shock.

Thus, in one broad embodiment the invention provides a seedling propagation assembly consisting of at least one propagation tray comprising a lower plant support section including at least one longitudinal channel for nutrient solution flow; and an upper spacer section having a series of spaced openings positioned longitudinally above each channel.

In a further embodiment the invention provides a seedling propagation assembly comprising a support tray including therein at least one longitudinally disposed channel for nutrient flow and within each channel at least one longitudinally disposed raised support strip.

GENERAL DESCRIPTION

The seedling propagation assembly involves the use of unique propagation trays which act singly and in series to achieve the desired results. In addition to major advantages discussed above, various additional benefits flow from the present system.

The system is based on a Propagation tray which comprises a plant support section which includes at least one longitudinally disposed channel along which nutrient solution flows from an inlet end to an outlet end. In the preferred embodiment the bottom of the channel is profiled to provide raised support strips to support the plantings. The plantings will normally consist of a growth block, preferably a rock wool cube, in which a seed has germinated or will germinate and throughout which the root structure will develop. In the preferred case the growth blocks are supported on a pair of raised support strips which transfer the bulk of the weight of the cubes and later of the seedlings to the support strips and away from the channel floor. For this purpose the support strips may be continuous along the bottom of the channel or may be discontinuous with the raised portions under the planting positions and gaps in the strips between those positions.

With the arrangement just discussed while the bulk of the weight of the plantings is supported on the support strips, the areas of the bottom of the planting which are not supported by support strips will tend to sag toward the bottom of the channel.

The effect of this arrangement is that there is a substantial decrease in the resistance to nutrient flow along the bottom of the channel than would be the case if the entire planting rested on the bottom of the channel. The nutrient solution is thus readily able to move through that portion of the planting cube and the roots which is sagging toward or to the channel bottom. At the same time the wicking or capillary effect of the growth cube and that part of the root system which may be lying in the channel bottom is such that nutrient solution will be drawn up into the growth cube and structure to nourish the planting.

The arrangement has thus in effect made a greater area of the bottom of the growth cube and root system more readily accessible to the nutrient solution. This arrangement also permits uninhibited root growth from all sides of the cube into the nutrient solution without subjecting the roots to the full weight of the rock wool growth cube, each of the plant support trays preferably comprises a number of parallel such channels separated by barrier walls.

In the preferred embodiment the support trays are preferably of a size which can be readily manipulated by a worker even when containing seedlings which have reached the degree of maturity at which they are transplanted. At the same time, it is desirable that a separate nutrient solution feed arrangement not be required for each of these relatively small trays. Accordingly, in the preferred embodiment means is provided for joining a series of the trays in the longitudinal direction in order to enable nutrient solution to flow continuously along adjoining channels of the series of trays. For this purpose the trays are preferably provided with a transverse weir across the channels at or adjacent to the inlet end of the tray and with a downwardly extending lip across the channels at or adjacent to the outlet end of the trays. The lip at the outlet end of one tray is then placed in overlapping arrangement over the weir of the inlet end of the next tray and so on through the series of trays. The entire series is sloped from the inlet end of the first tray to the outlet end of the last tray to maintain gravity flow of nutrient solution. The overlapping arrangement between the lips and weirs has a twofold purpose. First, it serves to aerate the nutrient solution at the inlet to each succeeding tray. Aeration of the solution is important to plant nutrition. As well, the overlapping arrangement prevents leakage and loss of solution which might otherwise occur at the area of joining between adjacent trays. Clearly other methods of joining could be utilized.

In a preferred embodiment a spacer assembly is utilized in conjunction with each of the support trays. Thus, a second tray is provided to rest on top of the support tray and which is provided with a series of openings corresponding to the positions at which growth cubes or the like plantings will be placed. These openings are positioned above the raised support strips in the channels of the support tray. In the preferred embodiment the openings in the spacer tray are sufficiently larger than the growth cubes in area to permit the growth cubes to be readily inserted and removed. This is particularly significant in avoiding root damage on removal.

A further advantage of the spacer assembly is that it prevents ingress of light to the nutrient solution to thereby reduce the possibility of algae growth and prevent algae from robbing nutrients from the solution.

Accordingly, a growth cube inserted through the openings onto the support strips below is provided by the spacer tray with lateral stability and is maintained properly spaced from other similar cubes. In the preferred case the openings include short downwardly extending smooth edged walls which prevent damage to the roots on removal of the cube. The walls also prevent the edges of the opening from cutting into the growth cube and possibly damaging the planting.

The spacer tray is preferably provided with depressions along its underside which mate with profiles or extensions on the support tray and on the barriers separating the channels of the support tray. Alternatively, the projections could be on the spacer tray with cooperating depressions in the support tray.

Preferably, the support tray and the spacer tray are bonded together to form a single unit.

BRIEF DESCRIPTION OF THE DRAWINGS

In drawings which illustrate embodiments of the invention.

Figure 1:
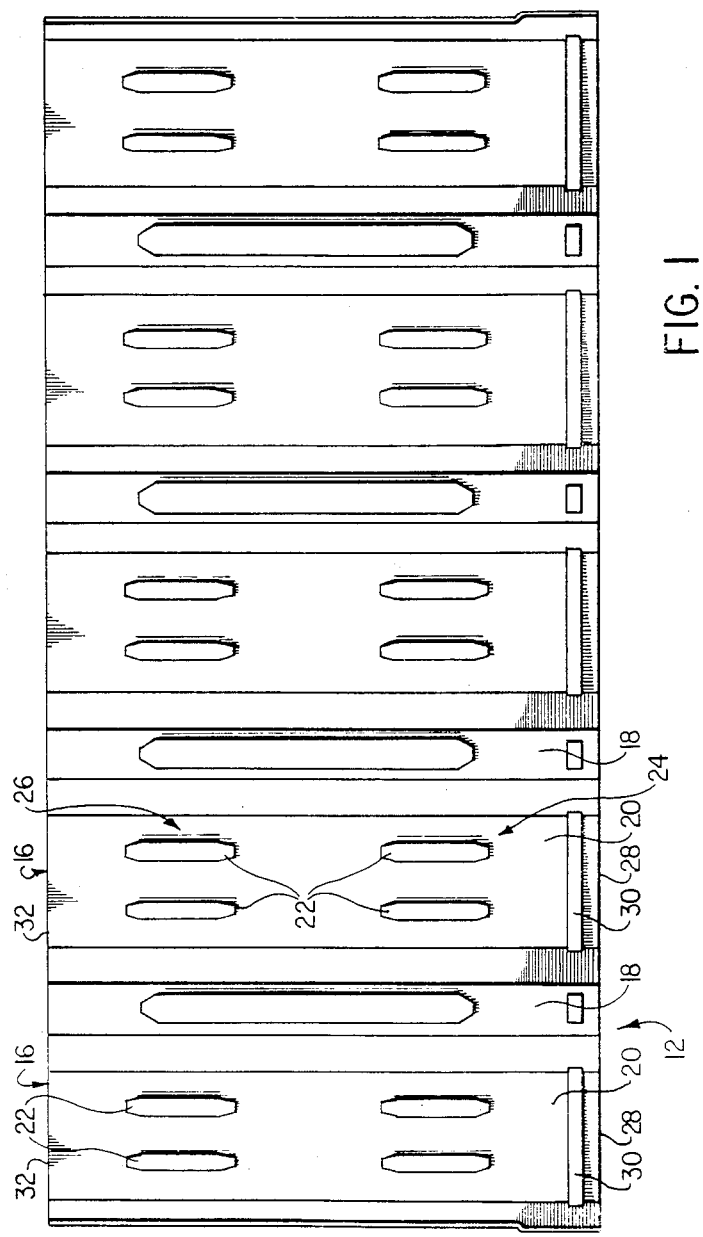
FIG. 1 is a plan view of a support tray according to the invention.
Figure 2:
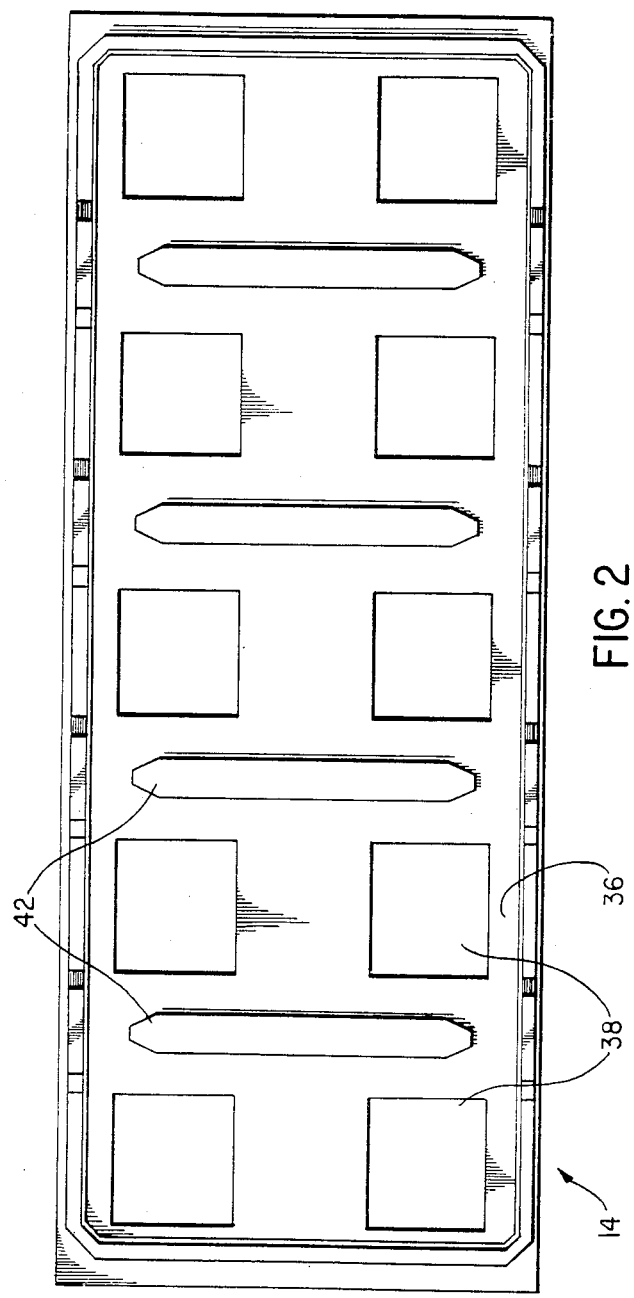
FIG. 2 is a plan view of a spacer tray according to the invention.
Figure 3:
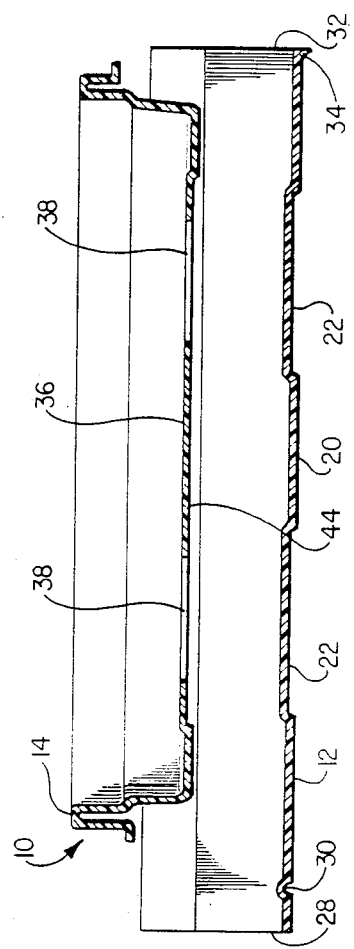
FIG. 3 is a longitudinal cross section through the combined trays of FIG. 1.
Figure 4:
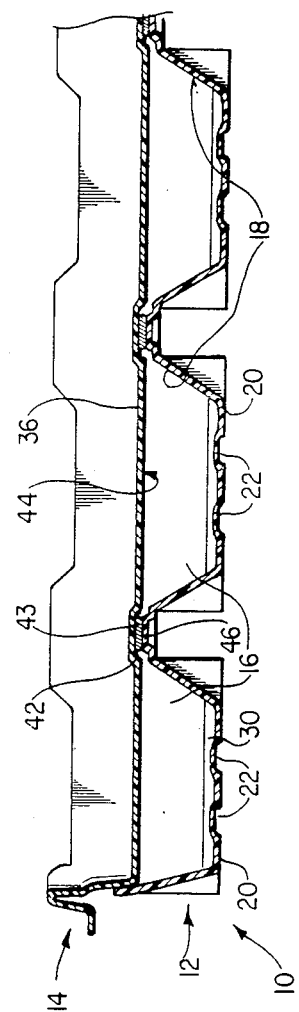
FIG. 4 is a transverse cross section through the combined trays of FIG. 1.
Figure 5:
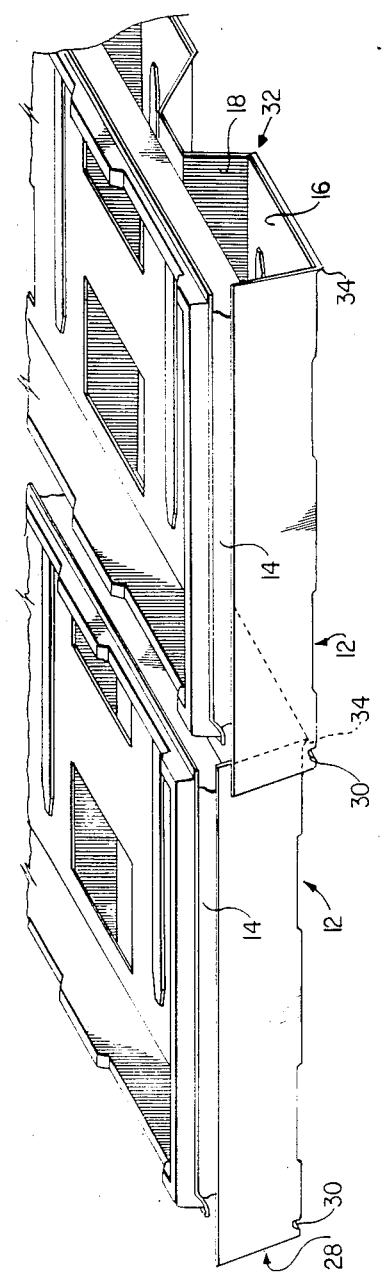
FIG. 5 is an isometric view of pact of two interconnected seedling propagation trays according to the invention.

While the invention will be described in conjunction with illustrated embodiments, it will be understood that it is not intended to limit the invention to such embodiments. On the contrary, it is intended to cover all alternatives, modifications and equivalents as may be included within the spirit and scope of the invention as defined by the appended claims.

DETAILED DESCRIPTION OF THE PREFERRED EMBODIMENTS

In the following description similar features in the drawings have been given similar reference numerals.

The propagation assembly 10 is conveniently discussed in terms of a lower support section or tray 12 and an upper spacer section or tray 14. The support tray 12 may be used without tray 14 but the two trays are preferably used together.

The lower section 12 includes at least one longitudinal channel 16 running the length of section 12. In the preferred case, as illustrated, section 12 includes a parallel series of channels 16 separated by barriers 18. The bottoms 20 of channels 16 are preferably provided with raised support strips 22. The strips may be continuous along the channels 16 but preferably, as illustrated, the strips are discontinuous and are arranged in pairs as at 24 and 26.

It is not essential that, where utilized, the strips be in pairs it may be found suitable in some cases to utilize single strips or a series of narrower strips. The requirement is only that the strips be suitable to perform the function to be described below.

The channels 16 are preferably provided at or adjacent their inlet end 28 with a transverse weir 30. As well, channels 16 are preferably provided at or adjacent their outlet end 32 with a transverse dropped lip 34.

In use, these embodiments of the invention would have a growth cube such as a rock wool cube containing a seed or seedling or, in some cases, a seedling, placed on the bottom of the channels and in the preferred case on the pairs 24 and 26 of support strips 22. Nutrient solution would then be introduced to the inlet end 28 of a channel 16 and by sloping the section 12 induced to flow along the channels to the outlet end 32. Where a transverse weir is present, the introduction of solution would be downstream of the weir.

In the preferred situation a series of sections 12 are arranged longitudinally with the dropped lip 34 of each section placed in overlapping relationship with the transverse weir of the next section This may of course imply that other parts of the structure also overlap and, in particular, the barriers 18. The entire series of sections 12 is sloped from the inlet end 28 of the first section to the outlet end 32 of a last section.

While the series is sloped over the entire distance, the overlap of the lip 34 and weir 30 will generally provide a stepped flow path for a nutrient solution which can now be introduced to the inlet end 28 of the first section 12 to flow through the series of sections to the outlet 32 of the last section in the series.

The plantings, as indicated preferably being within growth cubes, are preferably supported on the support strips 22. The strips are, however, sufficiently narrow and sufficiently spaced transversely that portions of the growth cubes or seedling roots which are not directly over strips 22 will tend to bulge or sag toward the bottom 20 of channels 16. When nutrient solution is caused to flow through the channels 16, because the bulk of the weight of the growth cube is carried by the support strips 22, the nutrient solution can much more readily penetrate those parts of the growth cube which bulge or sag to the bottoms 20 of the channel 16. The wicking or capillary effect is then such that nutrient solution will be drawn up into the cube to nourish the developing seedling in the cube.

The reduced impedance to flow prevents backup and pooling of nutrient solution and losses which would result when a backup level exceeded the height of weir 30. Deaeration resulting from stagnation is also avoided. Finally, this arrangement keeps the nutrient solution stream thin so that developing roots are not totally immersed. The absence of total immersion is important in practising the nutrient film techniques.

The increased ease of penetration provided by the support strips thus enables the nutrient solution to more readily contact a larger area of the bottom of the cube and particularly those areas lying along the bulged strips to thereby ensure that the entire cube receives adequate supplies of solution.

The overlapping arrangement of lip 34 with weir 30 provides further advantage in the nutrient film flow. The drop of the nutrient stream from the outlet end 32 of one section 12 over the weir 30 at the inlet end 28 of the next section in the series provides valuable aeration for the stream. The stream is thus re-aerated or further aerated at the end of each section 12 in the series.

As well, the overlapping arrangement of lip and weir prevents leakage and backflow of solution in the area of joining between adjacent sections 12.

The sections 12 are preferably used in conjunction with the upper spacer sections 14. A spacer section 14 includes a surface 36 provided with a series of openings 38. The openings 38 correspond with the desired spacing to be given to the growth cubes, seedlings or other forms of planting. In conjunction with sections 12 which are provided with pairs 24 and 26 of support strips 22, the openings 3B are aligned above the pairs, so that the growth block or planting placed through the opening 38 will be supported on strips 22.

In the preferred case the openings 38 are provided with short downwardly projecting walls 40 (not illustrated) to provide additional support for the plantings and to ensure that the surface restraining the planting against lateral movement is sufficiently wide to avoid cutting into the growth cube and possibly damaging the planting.

In the preferred case the section 14 is provided with depressions 42 in the underside 44 of surface 36 and mating projections 46 are provided on the barriers 18 between channels 16. The spacer section 14 then simply rests in this mating relationship on the support section 12. Clearly, the depressions and projections could be reversed or the section 14 could simply be provided with profiles to match the top of the barriers 18. Various other support systems between sections 12 and 14 could be used and are chosen simply for convenience.

In the preferred case the trays 12 and 14 are constructed of ABS or similar material and further are bonded as by a suitable cement 43 along the join between depressions 42 and projections 46.

Trays 12 and 14 may also be integral, but difficulties of molding suggest that they be preferably separately molded and subsequently joined.

The section 12 with or without the section 14 is in practice preferably of a size which can readily be lifted by a worker even where seedlings ready for transplant are in place in section 12. Because of this size factor, the entire series of propagation assemblies can be disassembled unit by unit to be moved to a production area where the seedlings are to be transplanted into production assemblies. It is therefore not necessary to remove the seedlings from the propagation assemblies in the nursery area to a transport means and subsequently transfer them from the transport means to the production assemblies. Rather, since the entire unit is taken to the production area, the plant need only be disturbed once and for a very short time while the growth cube with the seedling are transferred from the propagation assembly to the production assembly.

The spacer section 14 is of substantial significance in the transplanting operation, since it ensures that the roots of the developing seedlings will not have become intertwined. Separation of intertwined roots causes serious ser backs in growth of transplanted seedlings, so that problem is avoided where the spacer section 14 is utilized.

The specific profile chosen for the sections 12 and 14 provides a further advantage in seed germination. The profile of spacer 14 is such that tray section 12 will mate with spacer 14 when assemblies 10 are stacked vertically on each other. The depth of the depression on 14 is such that a vertical stack of 20 (minimum) is free standing and completely stable (sufficient interlocking between 2 trays). In addition, it is of such depth that emergence of a seedling from a seed in one tray is completely unimpeded by the bottom of the tray above it.

The purpose of this is to provide the capability of stacking a large number of trays with cubes and seeds in them in a relatively small area. When germinating, a seedling requires dark so there is no need for light to every tray. The temperature of the seed during germination is much more critical, i.e., it must be maintained within much tighter temperature tolerances. By stacking the trays, it is possible to economically control the temperature of a much smaller space within the required tolerances.

Thus it is apparent that there has been provided in accordance with the invention a seedling propagation assembly that fully satisfies the objects, aims and advantages set forth above. While the invention has been described in conjunction with specific embodiments thereof, it is evident that many alternatives, modifications and variations will be apparent to those skilled in the art in light of the foregoing description. Accordingly, it is intended to embrace all such alternatives, modifications and variations as fall within the spirit and broad scope of the invention.

What I claim as my invention:

1. A propagation tray for a seedling propagation assembly comprising
    a lower plant support section having at least one channel for a gravity flow of nutrient solution in film form from an inlet end thereof to an outlet end thereof and a plurality of integral raised support strips on a floor of said channel for supporting growth blocks thereon in spaced relation to said floor to permit the growth blocks to draw nutrient solution from said flow with minimal resistance to said flow; and
    an upper spacer section mounted on said lower section, said upper spacer section having a plurality of openings, each said opening disposed above at least one of said support strips for respectively receiving and laterally supporting the growth blocks therein.

2. The tray of claim 1 in which a spaced pair of said raised strips is located beneath each said opening.

3. The tray of claim 2 in which said raised strips are continuous along substantially the length of said at least one channel.

4. The assembly of claim 6 in which each said channel includes at or adjacent an inlet end thereof a transverse weir across the width thereof.

5. The assembly of claim 6 in which each said channel includes at or adjacent an outlet end thereof a transverse dropped lip across the width thereof.

6. The tray of claim 1 in which said support section and said spacer section are individual components not secured to each other.

7. The tray of claim 6 in which said spacer section includes indentations which mate with projections on said support section.

8. The tray of claim 6 in which said support section includes at least two side walls extending above said floor, and wherein said spacer section rests on said two side walls.

9. A seedling propagation assembly comprising a plurality of propagation trays secured in interconnected end-to-end relation, each said tray including a lower plant support section having at least one channel for a gravity flow of nutrient solution in film form from an inlet end thereof to an outlet end thereof and a plurality of integral raised support strips on a floor of said channel for supporting growth blocks thereon in spaced relation to said floor to permit the growth blocks to draw nutrient solution from said flow with minimal resistance to said flow; and an upper spacer section mounted on said lower section, said upper spacer section having a plurality of openings, each said opening disposed above at least one of said supports strips for respectively receiving and laterally supporting the growth blocks therein.

10. A seedling propagation assembly comprising
    an open-ended lower support tray including a plurality of parallel channels for individually receiving a flowing film of nutrient solution and at least one integral raised strip in a bottom of each channel for supporting a planting thereon to permit the planting to draw nutrient solution from said flow with minimal resistance to said flow; and
    an upper spacer tray mounted on said support tray with a plurality of openings aligned above said raised strips, said openings being spaced apart a distance corresponding to a desired spacing for the plantings.

11. An assembly as set forth in claim 10 wherein said lower tray includes a transverse weir at an inlet end of each channel and a depending lip at an outlet end of each channel.

12. An assembly as set forth in claim 10 wherein said lower tray includes a plurality of parallel upstanding barriers disposed in alternating manner with said channels to support said upper tray thereon.

* * * * *